Sept. 25, 1951  R. H. REISS ET AL  2,568,969
FASTENING DEVICE FOR THE WAISTBAND
OF TROUSERS AND THE LIKE
Filed Nov. 25, 1946  3 Sheets-Sheet 2
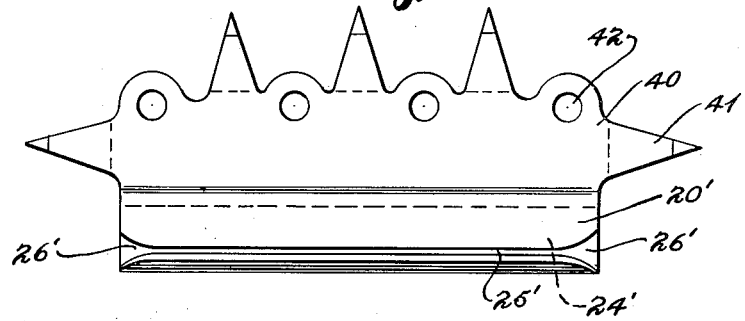
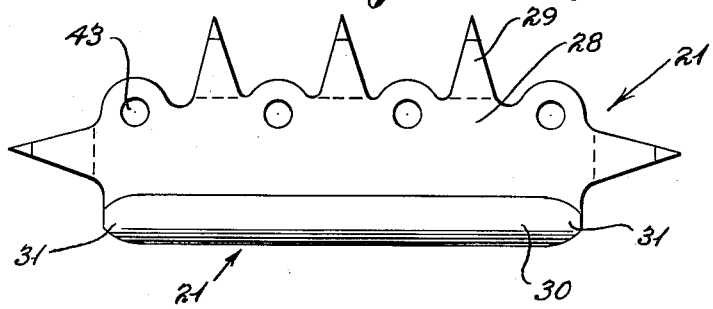
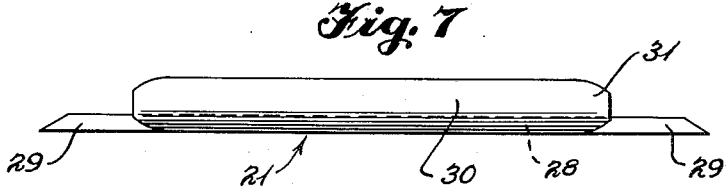
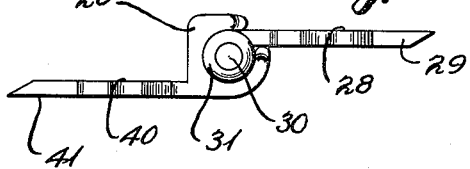
Inventors
Raymond H. Reiss and
Paul R. T. Hahn
By Cushman Darby Cushman
Attorneys Sept. 25, 1951 R. H. REISS ET AL 2,568,969
FASTENING DEVICE FOR THE WAISTBAND
OF TROUSERS AND THE LIKE
Filed Nov. 25, 1946 3 Sheets-Sheet 3
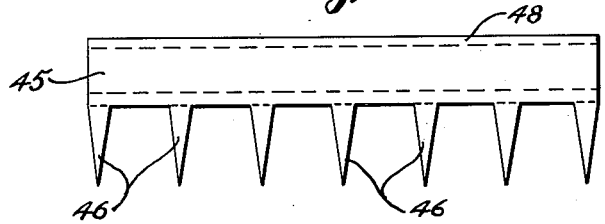
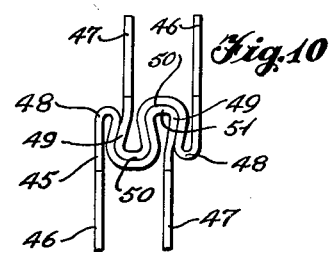
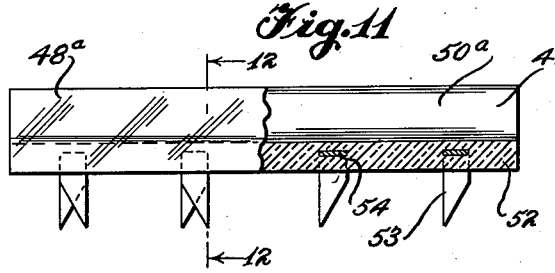
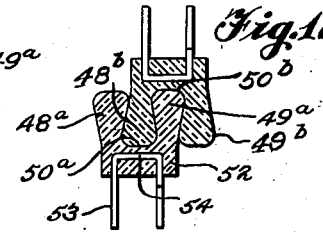
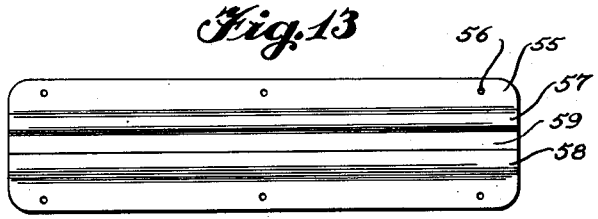
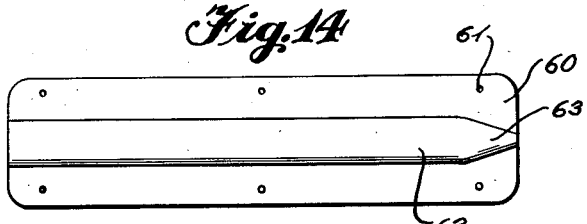
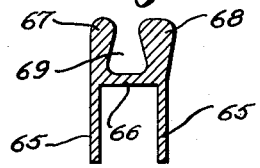
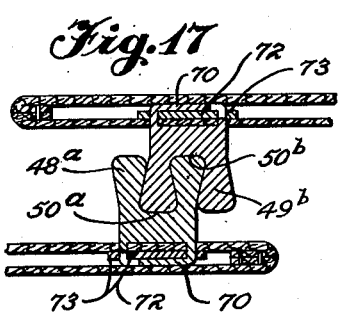
Inventors
Raymond H. Reiss 2nd
Paul R. T. Hahn
By Cushman Darby & Cushman
Attorneys Patented Sept. 25, 1951

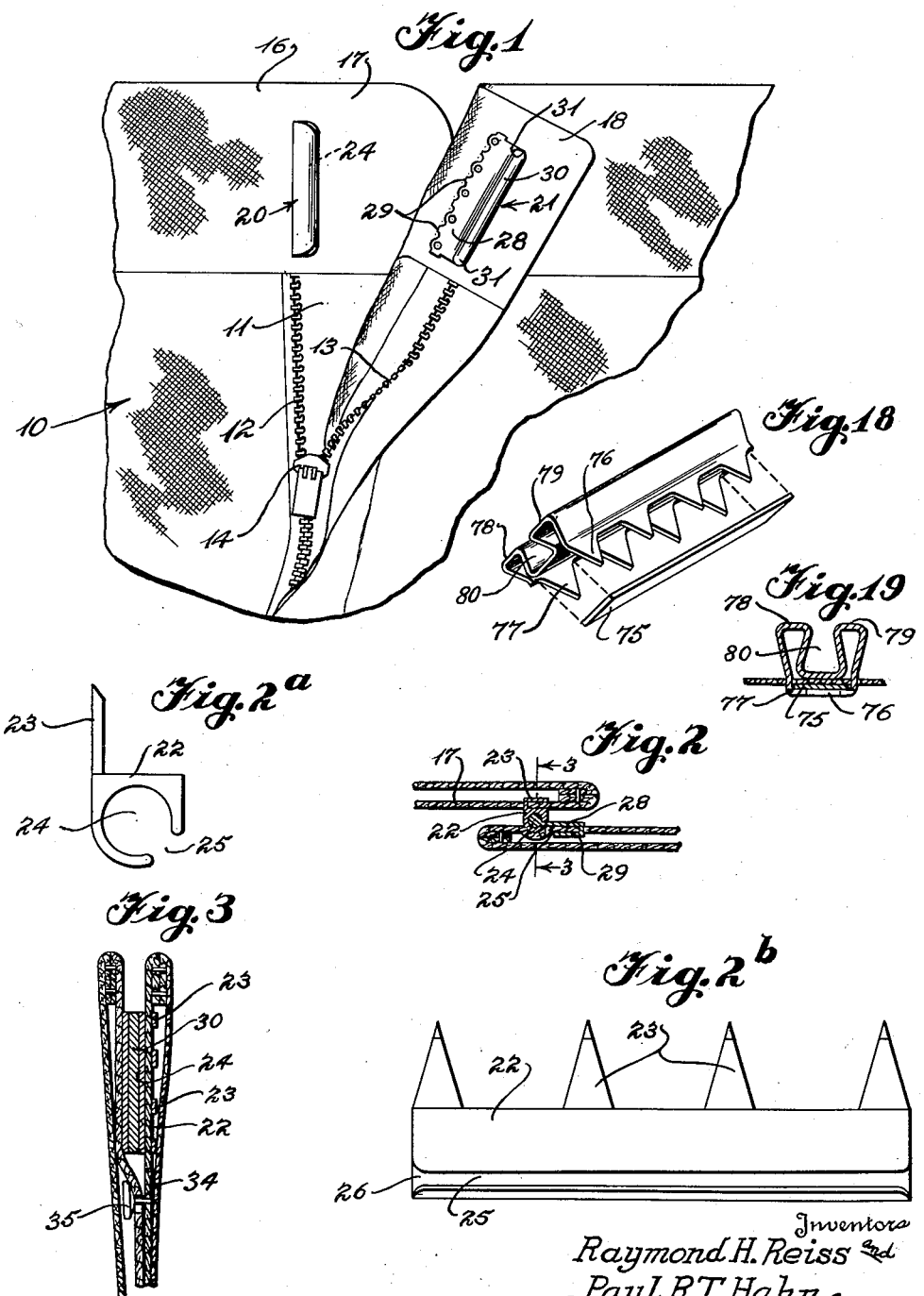

2,568,969

UNITED STATES PATENT OFFICE 2,568,969

FASTENING DEVICE FOR THE WAISTBAND OF TROUSERS AND THE LIKE

Raymond H. Reiss, New York, N. Y., and Paul R. T. Hahn, Westfield, N. J., assignors to Reiss Manufacturing Corporation, Wilmington, Del., a corporation of Delaware Application November 25, 1946, Serial No. 712,170

15 Claims. (Cl. 2—234)

1

The present invention relates to garments, such as men's and boys' trousers and women's skirts and, more particularly, to novel combinations of parts adapted for use in closing certain openings thereof, such as placket or fly openings, and for securing the overlapping ends of the waistbands thereof. The invention also relates to certain novel structural features of the fastening means per se.

An object of the invention is to provide an improved fastening device for the overlapping ends of the waistbands of trousers, skirts and like, which may be engaged and disengaged with great facility, when desired, but which will not become unfastened inadvertently in use.

Another object of the invention is to provide an improved waistband fastener, which cooperates in a novel manner with the closure means of an associated openings, so that the closure means, when in operative position performs an additional function in preventing inadvertent separation of the fastening means.

A further object of the invention is to provide fastening means for the overlapping ends of waistbands which may be connected and disconnected with greater facility than heretofore, when the closure means for an associated opening is in the open or in operative position, but which is held in the interlocked, fastened relation, against accidental separation, by the closure means when the latter is closed.

A further object of the invention is to provide garment fastening devices of simple and inexpensive construction, which may be manufactured in large numbers, expeditiously and with a minimum of trouble and expense.

A further object is to provide devices of the class described which may be readily attached to garments and which are unlikely to become inadvertently removed therefrom, during normal use or in the process of washing, dry cleaning, pressing or the like.

Another object of the invention is to provide fastening devices which, if inadvertently torn from the garment, may be readily replaced by a sewing operation or the like.

Other and further objects and advantages of the invention will be apparent from the following description of certain embodiments, shown for purposes of illustration in the accompanying drawings, in which Figure 1 is an elevational view of a garment, such as a pair of trousers, with the fastening device of the invention applied thereto.

Figure 2 is a horizontal sectional view through a fastener of the type shown in Figure 1, when in operative relation.

Figure 2a is an enlarged end elevation of the channel member shown in Figures 1 and 2.

Figure 2b is a side elevation, looking from the right of Figure 2a.

2

Figure 3 is a vertical section on line 3—3 of Figure 2, but showing a modified type of closure for the fly opening.

Figure 4 is an enlarged plan view of one of a modified form of channel member.

Figure 5 is an elevation of the device of Figure 4.

Figure 6 is a plan view of the complemental rib member, shown in Figures 1–3, adapted for cooperation with the channel members of Figures 2a, 2b, 4 and 5.

Figure 7 is an elevation of the device of Figure 6.

Figure 8 is an end elevation of the fastener of Figures 4 and 6, in connected relation, but not attached to a garment.

Figure 9 is a side elevation of a modified form of fastener member.

Figure 10 is an end elevation of two such members, interconnected, but not attached to a garment.

Figure 11 is a side elevational and partial longitudinal, vertical section of still another modification.

Figure 12 is a transverse section, showing the member connected to a similar member.

Figure 13 is a plan view of a modified form of channel member.

Figure 14 is a plan view of a modfied form of rib member, adapted to cooperate therewith.

Figure 15 is a transverse view, showing the cooperative relation of the members of Figures 13 and 14.

Figure 16 is a view similar to Figure 12 of still another modification.

Figure 17 is a transverse sectional view of another modification, showing the two members in cooperative relation, and attached overlapping garment parts.

Figure 18 is a perspective view of another modification of fastening device and an imperforate backing plate or bar, and Figure 19 is a section of the same applied to a garment.

Referring to Figure 1, a pair of trousers is shown at 10, having a fly opening 11 of conventional construction, provided with a closure such as a slide fastener, including rows of interfitting elements 12, 13, adapted to be brought into and out of cooperative relation by a slide 14 in the well-known manner. When the slide is in its lowermost position, the overlapping parts of the fly opening are disconnected, whereas, when it is in its uppermost position, the rows of elements 12 and 13 are in engagement, the opening is closed and relative vertical movement between the overlapping parts is prevented. At the upper end of the fly opening, there is a waistband 16 having overlapping ends 17 and 18, as is well understood in the garment making art.

In the past, it has been conventional practice to provide the overlapping ends of the waistband with cooperating buttons and buttonholes or large hooks and eyes. However, such fastening devices have been troublesome and inefficient in use, and constitute an appreciable item of cost in the manufacture of the garments. The waistbands of trousers and skirts are subjected to substantial strains in use and to considerable abuse and frictional wear, due to repeated opening and closing of the adjacent openings. Hence, conventional buttons often become loose and are eventually detached, while the buttonholes become frayed or torn. Similar difficulties are encountered with hooks and eyes, and even if the latter be mechanically attached by rivets or the like, the transverse movement of the parts, during repeated hooking and unhooking operations, has a tendency to wear out the fabric adjacent thereto.

The present invention aims to provide an improved fastening device for the waistband of trousers or skirts, which eliminates all of the difficulties of devices of the prior art. The invention provides a fastener which may be readily manipulated, but which will not become accidentally unfastened, in use.

The fastener comprises two members 20 and 21, secured to the overlapping ends 17, 18 of the waistband 16. Although the parts may be reversed, it is preferred to have the channel member 20 secured to the outer face of the inner, underlying end 17 and the rib member 21 secured to the inner face of the overlapping end 18. As shown in Figures 2, 2a and 2b, the member 20 comprises a body part 22 having a plurality of prongs 23 formed integrally therewith, adapted to be projected through the fabric 17 and laterally turned, to clinch the body part in position. The body is shaped to provide an elongated vertically extending, laterally enlarged channel 24 and an outwardly opening slot 25. The channel is open at both ends and the slot is flared laterally and widened adjacent its ends, as at 26, to facilitate the entrance of the rib member 21 thereinto.

The rib member 21 (Figures 1, 2, 3, 6 and 7) comprises a base plate 28 having a plurality of integral prongs 29, adapted to be turned outwardly and projected through the adjacent fabric and clinched rearwardly to secure the device to the waistband end 18. The member 21 carries an integral, elongated, vertically extending rib or bead 30, complemental in shape to the interior of the channel member 31 of the rib are preferably tapered or rounded off, to facilitate entry of the rib into the channel by relative endwise movement, the adjacent plate portion being adapted to enter the slot through the flared ends thereof.

When the parts are in the interfitting relation, as shown in Figures 2 and 3, the enlarged rib or bead 30 is restrained against transverse movement with respect to the channel 24 by reason of the interfitting relation of the parts, and the ends of the waistband are securely fastened against lateral separation.

In the use of the device, the rib 30 may be readily inserted into the channel 24 and removed therefrom by relative endwise movement of the parts, when the closure means for the opening 11 is in the inoperative, open position. The rib or bead 30, thus, may be inserted or removed by either relative upward or downward movement, since both ends of the channel 24 are open. When the closure means for the opening 11 is in the operative, closed position, be it a slide fastener of the type shown in Figure 1 or a conventional button and buttonhole arrangement 34, 35 as shown in Figure 3, the overlapping ends of the waistband are restrained against relative vertical movement. That is to say, the closure device which quite firmly attaches the overlapping garment parts immediately below the waistband, serves to prevent inadvertent vertical movement between the waistband ends. Consequently, relative endwise movement between the channel and rib members is prevented. Hence, accidental disengagement of the fastening members is prevented, as they can be separated by relative endwise movement only. However, when it is desired to disconnect the fastening elements, this may be accomplished by first releasing the closure for the opening 11, after which the waistband ends and the fastening members 20 and 21 may be moved relative to each other in an endwise or vertical direction.

The form of the invention shown in Figures 4-8 is quite similar to that shown in Figures 1-3 and differs therefrom primarily in that the member carrying the channel part or sleeve 20' is formed integrally with a base plate 40. The member may be made of extruded metal and the plate portion stamped or otherwise cut to provide a plurality of prongs 41 and apertures 42. The prongs, of course, are adapted to be turned down to the dotted line position (Figure 5) and projected through the fabric of the garment and clinched rearwardly, as previously explained. The apertures 42 may be employed to receive sewing threads, for attaching the device to a garment, if a clinching tool is not available, or if the prongs 41 have been broken or damaged in use. Thus, if the fastening member becomes accidentally dislodged, it may be re-attached by a tailor or anyone else, by a simple sewing operation.

The channel 24' is open at both ends and is provided with an outwardly opening slot 25', having laterally flaring ends 26'.

The rib member 21 is substantially identical to that shown in Figures 1-3, and includes a base plate 28, prongs 29 and a rib element 30 having rounded or tapered ends 31, to facilitate entry into the channel 24 or 24'. Sewing apertures 43 are provided in the base plate 28 for the purposes previously described.

The modification shown in Figures 9 and 10, instead of being made of extruded metal or the like, is stamped and bent from a relatively heavy strip of sheet metal, thereby reducing the cost of manufacture. Moreover, in this form of the invention, as well as in the forms shown in Figures 11, 12, 16 and 17, the fastener comprises two substantially identical members. Hence, the expense of providing separate dies and other machinery for the manufacture of the male and female members is eliminated, as only one set of equipment is required to manufacture the two identical parts.

Each strip of sheet metal 45 is provided with prongs 46, 47 along one or both edges, adapted to be clinched rearwardly to secure the fastener to the garment. The metal is bent and shaped to provide two parallel ribs 48, 49, and an intermediate inwardly and laterally flaring channel 50, parallel to the ribs and open at both ends. The rib 49 is complemental in cross-sectional shape to the cross-sectional shape of the channel 50 and flares laterally and outwardly, from its inner end to its head 51. Hence, the rib 49 of one member is adapted to be inserted into the channel 50 of the other member, to be retained therein against transverse lateral movement.

As shown in Figures 11, 12 and 17, the two marginal ribs 48a, 49a, 48b, 49b may be of substantially identical cross-sectional shape, each complemental to the shape of the intermediate channel 50a or 50b. This arrangement is preferred, so that either rib of one member may be inserted into the channel of the other member, and vice versa.

In the modification shown in Figures 11 and 12, the body 52 of the fastener element is made of a molded, plastic material, such as synthetic resin or the like, and the attaching prongs 53, in the form of metallic staples are embedded in the body thereof, during the molding operation. These prongs may be set in the mold, and the plastic material cast about the upper portions 54 thereof. Thus, the fastening members may be firmly secured to the garment parts by clinching over the metal prongs, while all of the advantages of using plastic, moldable material for the bodies are accomplished.

In the form of the invention shown in Figures 13-15, the fastener members are formed of extruded metal or molded, plastic material. One member comprises a base plate 55 having apertures 56 for the reception of sewing threads, attaching rivets or the like. A pair of upstanding ribs 57, 58 have their outer ends turned laterally toward each other, to provide a T-shaped, undercut channel 59, extending the full length of the member and open at both ends.

The other member comprises a base plate 60 having attaching apertures 61 and a T-shaped, headed rib or rail 62, tapered at one or both ends 63, adapted for reception in the channel 59 by relative endwise movement and restrained against lateral separation by the interfitting relation with the walls thereof.

The form of the invention shown in Figure 16 is similar to that shown in Figures 9 and 10, except that it is formed from extruded metal or the like. Each of the two members of the fastening device is substantially identical to the other, and includes attaching prongs 65, a base plate 66, ribs 67 and 68 and a channel 69, complemental in cross-sectional shape to one of the ribs. As previously explained, the channel 69 is adapted to receive the rib 68 of the other member, and vice versa.

The form of the invention shown in Figure 17 is similar to that shown in Figures 11 and 12, and differs therefrom in that each member is a unitary piece, made of extruded metal or the like and having attaching prongs 70 formed integrally therewith. A backing plate 72 having slots or apertures 73 for the reception of the prongs 70 may be employed, behind one or more of the fabric plies of the waistband, thereby eliminating the possibility of the prongs pulling out of the fabric. A backing plate of this type may, of course, be used in combination with any or all forms of the invention shown and described herein.

As shown in Figures 18 and 19, instead of using a backing plate having slots or apertures 73 formed therein for the reception of prongs 70, a simple flat, bar-like, imperforate plate 75 may be employed, of substantially the same width of the space between the two rows of prongs 76, 77 formed along the opposite edges of the fastening device. The prongs 76, 77 are preferably arranged in staggered relation so that, when they are turned over, around the side edges of the backing plate and underneath the same, the prongs on one side will lie between the prongs on the other. The fastening member of Figures 18 and 19 is preferably stamped and bent from a single piece of sheet metal, and includes a pair of ribs 78, 79 having substantially the identical cross-sectional shape, and an intermediate groove or channel 80, of complemental cross-sectional shape.

When the two fastener members of the forms of the invention shown in Figures 11, 12, 17, 18 and 19 are assembled, either rib of one member may be received snugly in the intermediate channel of the other, and vice versa. Thus, with these forms of the invention, a double lock is provided. One rib on each member is firmly engaged, in interfitting relation, within a channel of complemental shape in the other member, so that separation of the parts by transverse movement is impossible. However, the fastener members may be readily separated and re-fastened by relative endwise movement, as previously described, in connection with the form of the invention shown in Figures 1-3.

It will be understood that, in all forms of the invention, the slide fastener or the button closure for the fly or placket opening, when in the operative position, normally serves to prevent relative endwise movement between the parts and inadvertent separation thereof.

In the accompanying claims, the term "waistband" is used to refer to the portion of the garment, such as a pair of trousers, or a skirt, surrounding the waist or adjacent portion of the wearer's body, and is not to be limited to a separate piece, sewed or otherwise attached to the garment, but includes constructions employing what is known in the trade as a "continuous waistband." Conventionally, the waistband is usually cut from a strip of the goods where the trouser legs taper, which would otherwise be wasted. By applying this strip to the upper end of the trouser legs, a saving in the length of the goods is effected, since the trousers may be cut 1½ or 2 inches shorter. The so-called continuous waistband, however, is not a separate band at all, but is simply a continuation of the trouser leg itself, extended upward to the desired termination. It must be understood that the term "waistband," in the appended claims, covers both types of construction.

The invention is not limited to the exact details of construction shown in the accompanying drawings and described above, but covers all modifications coming within the scope of the appended claims and their equivalents.

We claim:

1. The combination with a garment having a placket or fly opening, a waistband terminating in overlapping end portions at the upper end of said opening and separable closure means for the opening, of a fastener for the overlapping portions of the waistband, said fastener comprising substantially rigid, vertically elongated members secured in juxtaposed relation, respectively, to the inner and outer faces of said portions in spaced relation to the ends thereof, and concealed by the overlap thereof, each of the members being of substantially uniform cross-sectional shape from end to end and having a part complemental to and interfitting with a part of the other, said parts being shaped for inter-engagement by relative endwise movement of the members only, to be retained in interfitting relation against lateral separation, said members being restrained against relative endwise movement and inadvertent separation by said closure means for the opening, when the latter is in operative relation retaining the opening closed.

2. The combination with a garment having a placket or fly opening, a waistband terminating in overlapping end portions at the upper end of said opening and closure means for the opening, of a fastener for the overlapping portions of the waistband, said fastener comprising a vertically disposed channel member secured to one of said portions in spaced relation to the end thereof, and a vertically disposed rib member secured to the other end portion in spaced relation to the end thereof, shaped to enter the channel member by endwise movement only and to be retained therein against lateral separation, said members being concealed by the overlap of said waistband end portions, said closure means when closing the opening serving to prevent inadvertent relative vertical movement of the ends of the waistband and endwise movement between the fastener members and consequent inadvertent separation thereof.

3. A garment comprising a waistband terminating in overlapping end portions, a placket or fly opening extending downwardly from the waistband, fastening means for the end portions of the waistband and closure means for the fly opening, said fastening means comprising a pair of members, one member including a base plate, means associated therewith securing the same to one of said portions of the waistband in spaced relation to the end thereof, and an integral, rigid, vertically extending sleeve parallel to the plate disposed outwardly thereof having a narrow continuous slot opening into the interior of the sleeve and having laterally flaring ends, the other member including a base plate, means associated therewith securing the same to the other end of the waistband and a raised, integral rib parallel to the associated plate and of greater transverse thickness than said slot and adapted to be received within said sleeve by relative endwise movement only, to be retained therein against transverse separation, said flaring slot ends facilitating the entrance of the rib into the sleeve said closure means for the opening, when in operative position, comprising means for preventing inadvertent relative vertical movement between the ends of the waistband and inadvertent endwise separation of said members.

4. A garment comprising a waistband terminating in overlapping ends, a placket or fly opening extending downwardly from the waistband, fastening means for the ends of the waistband and a closure means for the fly opening, said fastening means comprising two members each secured to one of the waistband ends, the members being of substantially identical construction and each comprising a vertically elongated re-entrant channel and an outwardly projecting, transversely enlarged rib parallel thereto and of cross-sectional shape complemental to the cross-sectional shape of the channel, whereby the rib of one member may be inserted into the channel of the other by relative endwise movement only, said closure means for the opening comprising means for preventing relative vertical movement between the ends of the waistband and inadvertent relative endwise movement between the members.

5. A garment comprising a waistband terminating in overlapping ends, a placket or fly opening extending downwardly from the waistband, fastening means for the ends of the waistband and closure means for the fly opening, said fastening means comprising two members, each secured to one of the ends of the waistband, the members being of substantially identical construction and each comprising a pair of elongated outwardly flaring ribs of substantially the same cross-sectional shape and an intermediate, parallel, inwardly flaring channel of complemental cross-sectional shape, whereby one rib of one member may be inserted into the channel of the other and vice versa by relative endwise movement only, said closure means for the opening comprising means for preventing inadvertent relative vertical movement between the ends of the waistband and relative endwise movement between the ends of the members.

6. A garment comprising a waistband terminating in overlapping ends, a placket or fly opening extending downwardly from the waistband, fastening means for the ends of the waistband and closure means for the fly opening, said fastening means comprising a member secured to one end of the waistband, including a base plate, and a pair of raised vertically disposed laterally turned ribs providing a vertically disposed, laterally flaring, T-section channel, and another member secured to the other end of the waistband including a base plate and a raised rib or rail complemental in cross-sectional shape to said channel and adapted for insertion therein and removal therefrom by relative vertical, endwise movement between the members only, said closure means for the opening comprising means for preventing relative vertical movement between the ends of the waistband and inadvertent separation of the members.

7. A fastener comprising two members, adapted to be secured respectively to the inner and outer surfaces of the overlying and underlying end portions, respectively, of overlapping garment parts to be fastened, the members being of substantially identical construction and each comprising an elongated base adapted to be secured to one of said surfaces, an elongated inwardly and laterally flaring channel open at both ends, disposed outwardly of said base opposite to the outer surface thereof, and an elongated laterally and outwardly flaring rib parallel thereto and of a cross-sectional shape complemental to the cross-sectional shape of the channel, whereby the rib of one member may be inserted into the channel of the other by relative endwise movement only, through either of the ends thereof.

8. A fastener comprising two members each adapted to be secured to the surface of one of a pair of overlapping garment parts to be fastened, the members being of substantially identical construction, and each comprising a base, prong means carried by said base facilitating securement thereof to one of the parts, an elongated re-entrant channel open at both ends, disposed opposite to and outwardly beyond said base and an elongated outwardly and laterally flaring rib parallel thereto and of a cross-sectional shape complemental to the cross-sectional shape of the channel, whereby the rib of one member may be inserted into the channel of the other by relative endwise movement through either end thereof.

9. A fastener comprising two members each adapted to be secured to the surface of one of a pair of overlapping parts to be fastened, the members being of substantially identical construction and each comprising a strip of relatively rigid sheet metal, bent and shaped to provide a flat base, a plurality of prongs integral therewith and projecting downwardly therefrom for securing the member to the part, an elongated channel above said base, having a restricted longitudinal slot opening thereinto and open ends, and an elongated outwardly projecting rib parallel to the channel and the base and having a cross-sectional shape complemental to the cross-sectional shape of the channel, whereby the rib of one member may be inserted into the channel of the other member by relative endwise movement and vice versa.

10. A fastener comprising two members each adapted to be secured to the surface of one of a pair of overlapping garment parts to be fastened, the members being of substantially identical construction and each comprising a pair of elongated outwardly and laterally flaring ribs of substantially identical cross-sectional shape and an intermediate, parallel, inwardly and laterally flaring channel of complemental cross-sectional shape, whereby one rib of one member may be inserted into the channel of the other by relative endwise movement and vice versa.

11. The combination with a garment having a waistband terminating in overlapping ends and a placket or fly opening extending downwardly therefrom, of fastening means for the ends of the waistband and closure means for the opening, said fastening means comprising members at the ends of the waistband having vertically elongated interfitting parts shaped for interconnection and disconnection by relative vertical movement only, prongs integral with said members extending through at least a portion of the waistband, and a backing plate behind said portion, behind which the prongs are clinched to secure the members to the waistband, said closure means for the opening comprising means for preventing inadvertent vertical movement between the ends of the waistband and the members and inadvertent separation thereof.

12. The combination with a garment having a waistband terminating in overlapping ends and a placket or fly opening extending downwardly therefrom, of fastening means for the ends of the waistband and closure means for the opening, said fastening means comprising members at the ends of the waistband having vertically elongated interfitting parts shaped for interconnection and disconnection by relative vertical movement only, prongs integral with said members extending through at least a portion of the waistband, and an apertured backing plate behind said portion through which the prongs extend and behind which they are clinched to secure the members to the waistband, said closure means for the opening comprising means for preventing inadvertent vertical movement between the ends of the waistband and the members and inadvertent separation thereof.

13. The combination with a garment having a placket or fly opening, a waistband terminating in overlapping end portions at the upper end of said opening and closure means for the opening, of a fastener for said portions of the waistband, said fastener comprising two substantially identical elements, one secured to the outer surface of the underlying waistband portion in spaced relation to the end thereof and the other secured to the inner surface of the overlying portion in similarly spaced relation, each element comprising a relatively rigid unitary sheet metal member shaped to provide a vertically elongated base plate positioned flatwise upon one of said surfaces, a plurality of prongs projecting rearwardly with respect to said plate into the waistband and securing the same in position, a vertically elongated, laterally turned portion providing a headed rib and a vertically elongated re-entrant channel adjacent said rib open at both ends, said rib of one member being shaped to enter the channel of the other member by endwise movement only and to be retained therein against lateral separation, said closure means for the placket or fly opening when in its operative position closing the opening, serving to prevent inadvertent relative vertical movement of the end portions of the waistband and relative endwise movement between elements and inadvertent separation thereof.

14. The combination with a garment having a placket or fly opening, a waistband terminating in overlapping end portions at the upper end of said opening and closure means for the opening, of a fastener for said portions of the waistband, said fastener comprising two interfitting elements, one secured to the outer surface of the underlying waistband portion in spaced relation to the end thereof and the other secured to the inner surface of the overlying portion in similarly spaced relation, one of said elements comprising a body shaped to provide a base, a plurality of integral prongs extending from the margins of said base rearwardly therefrom into the waistband portion and securing the same to the surface thereof, and a vertically extending, laterally enlarged channel, disposed forwardly beyond said base, opening laterally through a narrow slot in said body, the other element being shaped to provide a base plate, a plurality of integral prongs extending from the margins thereof rearwardly into the other waistband portion and securing the same to the surface thereof, and an integral, elongated, transversely enlarged, vertically extending rib projecting outwardly beyond the base plate and connected thereto by a plate extension, said rib being adapted to enter the channel of the other element by endwise movement only, with said plate extension disposed in said slot, said closure means for the placket or fly opening when in its operative position, closing the opening, serving to prevent inadvertent relative movement of the end portions of the waistband and relative endwise movement between the fastener elements and inadvertent separation thereof.

15. The combination of claim 14 characterized in that said slot has laterally widened, flared ends to facilitate the entry of the rib and plate extension in the channel and slot, respectively.

RAYMOND H. REISS.
PAUL R. T. HAHN.

REFERENCES CITED

The following references are of record in the file of this patent:

UNITED STATES PATENTS

| Number | Name | Date |
|---|---|---|
| 1,044,686 | Osmers | Nov. 19, 1912 |
| 1,119,222 | Baum | Dec. 1, 1914 |
| 1,467,465 | Wiedmann | Sept. 11, 1923 |
| 1,981,813 | Schuster | Nov. 20, 1934 |
| 1,991,561 | Krantz | Feb. 19, 1935 |
| 2,035,674 | Sipe | Mar. 31, 1936 |
| 2,144,755 | Freedman | Jan. 24, 1939 |
| 2,166,092 | Galloway | July 11, 1939 |